United States Patent
Xie et al.

(10) Patent No.: US 12,032,571 B2
(45) Date of Patent: Jul. 9, 2024

(54) AI MODEL OPTIMIZATION METHOD AND APPARATUS

(71) Applicant: Huawei Cloud Computing Technologies Co., Ltd., Guizhou (CN)

(72) Inventors: Kaiyuan Xie, Hangzhou (CN); Xiaolong Bai, Hangzhou (CN); Wenqi Fu, Hangzhou (CN); Chenghui Yu, Gui'an (CN); Weimin Zhou, Shenzhen (CN)

(73) Assignee: Huawei Cloud Computing Technologies Co., Ltd., Gui'an (CN)

( * ) Notice: Subject to any disclaimer, the term of this patent is extended or adjusted under 35 U.S.C. 154(b) by 67 days.

(21) Appl. No.: 17/694,970

(22) Filed: Mar. 15, 2022

(65) Prior Publication Data

US 2022/0197901 A1 Jun. 23, 2022

Related U.S. Application Data

(63) Continuation of application No. PCT/CN2020/097973, filed on Jun. 24, 2020.

(30) Foreign Application Priority Data

Sep. 17, 2019 (CN) .......................... 201910877331.6
May 19, 2020 (CN) .......................... 202010423371.6

(51) Int. Cl.
  *G06F 7/00* (2006.01)
  *G06F 16/2453* (2019.01)
  *G06N 20/00* (2019.01)
(52) U.S. Cl.
  CPC ......... *G06F 16/2453* (2019.01); *G06N 20/00* (2019.01)

(58) Field of Classification Search
  CPC .... G06F 16/2453; G06F 16/212; G06F 16/28; G06N 20/00; G06N 3/045; G06N 5/01; G06N 3/08; G06N 3/105
  See application file for complete search history.

(56) References Cited

U.S. PATENT DOCUMENTS

| 8,775,332 B1 * | 7/2014 | Morris | ..................... G06N 5/02 706/11 |
| 9,443,192 B1 * | 9/2016 | Cosic | ..................... G06N 5/048 |

(Continued)

FOREIGN PATENT DOCUMENTS

| CN | 106779087 A | 5/2017 |
| CN | 108021983 A | 5/2018 |

(Continued)

OTHER PUBLICATIONS

Jason Liang et al: "Evolutionary Neural AutoML for Deep Learning", arxiv.org, Cornell University Library, 201 Olin Library Cornell University Ithaca, NY 14853,2019, XP081162022, total 9 pages.

(Continued)

*Primary Examiner* — Mohammed R Uddin
(74) *Attorney, Agent, or Firm* — Huawei Cloud Computing Technologies Co., Ltd.

(57) ABSTRACT

In a method for AI model optimization, an optimization device receives an original AI model and search configuration information that comprises a plurality of search items each indicating its search categories for performing optimization information search on the original AI model. The device obtains a plurality of search operators corresponding to the plurality of search items, and arranges the search operators in an operation sequence based on the search configuration information. The device then executes the search operators in the arranged operation sequence on the original AI model to obtain an optimized AI model. In the execution of the operation sequence, each search operator, (Continued)

except for the first search operator in the operation sequence, is executed utilizing operation results of a preceding search operator in the operation sequence, the operation results including generated network structures and search space information.

6 Claims, 8 Drawing Sheets

(56) References Cited

U.S. PATENT DOCUMENTS

| | | | | |
|---|---|---|---|---|
| 11,694,124 | B2* | 7/2023 | Ramalingam | G06N 20/00 |
| | | | | 706/12 |
| 2007/0179917 | A1* | 8/2007 | Patel | G06N 3/126 |
| | | | | 706/13 |
| 2016/0275413 | A1 | 9/2016 | Shi et al. | |
| 2017/0213155 | A1* | 7/2017 | Hammond | G06N 3/008 |
| 2019/0332667 | A1* | 10/2019 | Williams | G06N 5/022 |
| 2020/0293898 | A1* | 9/2020 | Okamoto | G06N 20/20 |
| 2020/0387818 | A1* | 12/2020 | Chan | G06F 17/18 |
| 2021/0034959 | A1* | 2/2021 | Wood | G06N 3/0409 |
| 2022/0180317 | A1* | 6/2022 | Andrews | G06F 40/279 |
| 2022/0197901 | A1* | 6/2022 | Xie | G06N 3/105 |
| 2023/0275715 | A1* | 8/2023 | Paz | H04L 5/0048 |
| | | | | 370/329 |

FOREIGN PATENT DOCUMENTS

| | | |
|---|---|---|
| CN | 108399451 A | 8/2018 |
| CN | 109447277 A | 3/2019 |
| CN | 110020667 A | 7/2019 |
| CN | 110110862 A | 8/2019 |

OTHER PUBLICATIONS

Jinwoong Kim et al: "CHOPT : Automated Hyperparameter Optimization Framework for Cloud-Based Machine Learning Platforms", arxiv.org, Cornell University Library, 201 Olin Library Cornell University Ithaca, NY 14853, Oct. 2018 (Oct. 2018), XP080930886, total 11 pages.

Xin He et al., "AutoML: A Survey of the State-of-the-Art",ArXiv, Aug. 14, 2019, XP055969683, total 17 pages.

* cited by examiner

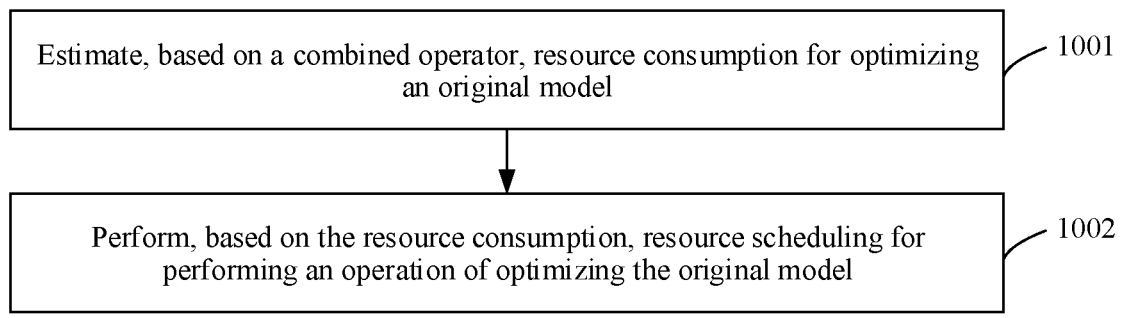
FIG. 9
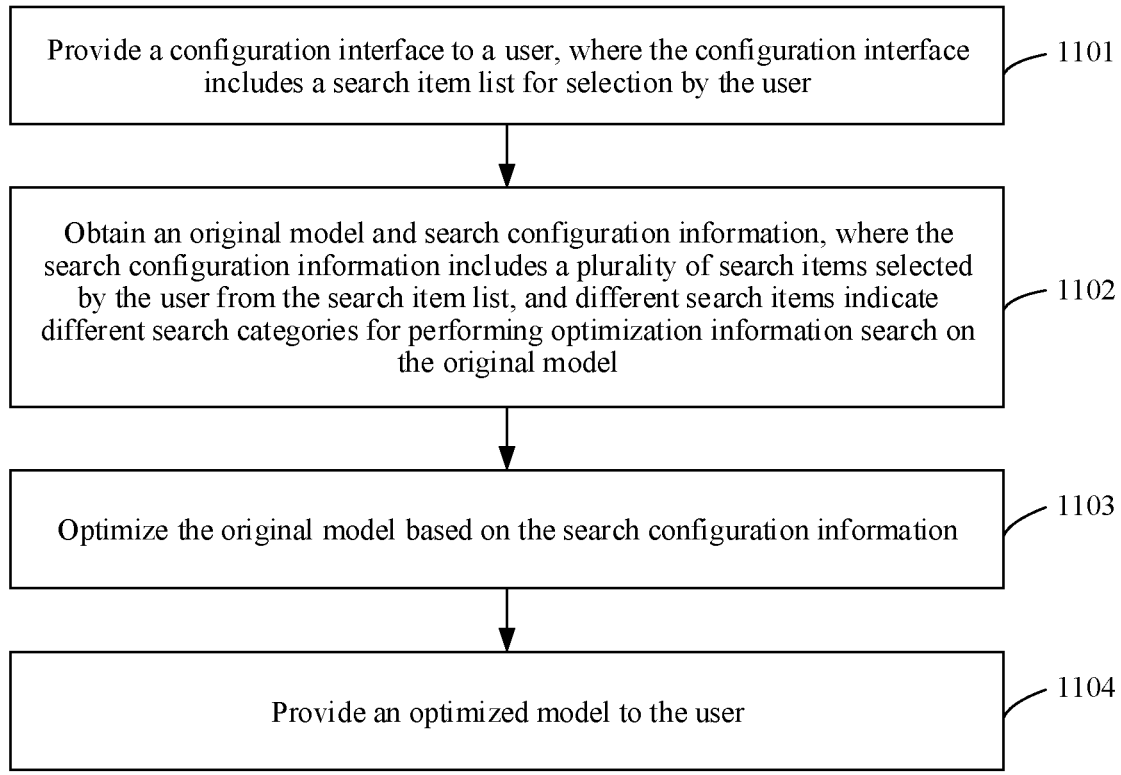
FIG. 10
FIG. 11

AI MODEL OPTIMIZATION METHOD AND APPARATUS

CROSS-REFERENCE TO RELATED APPLICATIONS

This is a continuation of International Patent Application PCT/CN2020/097973, filed on Jun. 24, 2020, which claims priority to Chinese Patent Application No. 202010423371.6, filed on May 19, 2020, and Chinese Patent Application No. 201910877331.6, filed on Sep. 17, 2019. All of the aforementioned priority patent applications are hereby incorporated by reference in their entirety.

TECHNICAL FIELD

This application relates to the field of artificial intelligence (AI).

BACKGROUND

As AI models are increasingly widely used, there are different performance requirements for the AI models in different application scenarios. For example, a facial recognition model applied to unlocking of a smartphone needs to achieve 99.2% accuracy and a small inference delay, and a model applied to object classification needs to achieve accuracy higher than 95%. Performance of the AI model is closely related to a structure, hyperparameters, training data or inference data, loss functions, and the like of the AI model.

Currently, various AI platforms are provided in related technologies, to obtain an AI model that meets an application requirement. These AI platforms may perform, based on user's requirement, optimization such as hyperparameter search or network structure optimization on a generated initial network or an original AI model provided by a user, to output the AI model that meets user's requirement. However, when these AI platforms perform AI model optimization, only a single optimization function is provided during each optimization operation, such that model optimization is performed from only one aspect.

SUMMARY

This application provides a model optimization method, so that joint optimization of a plurality of dimensions can be performed on an initial AI model, to obtain an optimized model in a comprehensive space, with model performance improved. Technical solutions are as follows:

According to a first aspect, a model optimization method is provided. The method includes: obtaining an original model and search configuration information of a user, where the search configuration information includes a plurality of search items, and different search items indicate different search categories for performing optimization information search on the original model; orchestrating a plurality of search operators based on the search configuration information, to obtain a combined operator, where each orchestrated search operator corresponds to one search item, and the search operator indicates an algorithm used to execute the corresponding search item; and optimizing the original model based on the combined operator, to obtain an optimized model.

In embodiments of this application, the search configuration information including the plurality of search items may be obtained, and the search operators corresponding to the plurality of search items are orchestrated based on the search configuration information, to obtain the combined operator. In this way, optimization for the plurality of search items may be performed on the original model based on the combined operator. In other words, in embodiments of this application, joint optimization of a plurality of dimensions may be performed on the original model, to obtain an optimized model in a comprehensive space, with model performance improved.

Optionally, the plurality of search items in the search configuration information may include at least two of hyperparameter search, network architecture search, data augmentation search, loss function search, optimizer search, and model compression policy search.

The hyperparameter search is to search, by using a hyperparameter search algorithm, a specified search space for a hyperparameter that conforms to the original model. The hyperparameter is a parameter that cannot be obtained through model training in an AI model (for example, a neural network model). For example, the hyperparameter includes parameters such as a learning rate and a quantity of iterations. The network architecture search is to search, based on algorithms such as an evolutionary algorithm, a reinforcement learning algorithm, and a differentiable network algorithm, a specified search space for a network architecture that meets a user requirement. The network architecture indicates a basic structure of an AI model. The data augmentation search is to search, based on a specified data set, for a data augmentation policy that meets a user requirement, and then process a sample in the data set according to the data augmentation policy. The data augmentation policy is an algorithm used to preprocess training data, test data, or inference data. Training, testing, or inference is performed on an AI model by using a processed sample in the data set, so that performance of the AI model can be better. The loss function search is to search a specified search space for a loss function that meets a user requirement. The loss function is used to perform model optimization when the original model is trained. The optimizer search is to search a specified search space for an optimizer that meets a requirement, and then perform model parameter learning by using the optimizer, so that performance of an AI model can be better. The model compression policy search is to search a specified search space for a model compression policy, to implement compression and tailoring of an AI model.

Optionally, an implementation process of the orchestrating a plurality of search operators based on the search configuration information, to obtain a combined operator may be: determining an operation sequence, quantities of operations, or comprehensive search spaces in each operation of the plurality of search operators based on the search configuration information; and generating the combined operator based on the operation sequence, the quantities of operations, or the comprehensive search spaces in each operation of the plurality of search operators.

The comprehensive search space is a search space obtained by merging search spaces corresponding to different search items, or may be respective search spaces obtained after search spaces corresponding to different search items affect each other. In embodiments of this application, the operation sequence, the quantities of operations, and the comprehensive search spaces in each operation of the plurality of search operators are determined, to obtain the final combined operator. In this way, when the original model is optimized based on the combined operator, optimization information of the original model can be found from the comprehensive search space. That is, in embodiments of this application, search is not performed in a single search space corresponding to a search item, but performed in the comprehensive search space based on the combined operator. This is equivalent to searching the comprehensive search space for optimization information of a model. In this way, the model optimized based on the obtained optimization information is the optimized model in the comprehensive search space, with performance of the optimized model improved.

Optionally, the search configuration information further includes search item information and a search mode, each search item corresponds to search item information, and the search mode is used to indicate a principle followed when the original model is optimized.

The search item information includes some information used when a corresponding search item is searched for. For example, the search item information may include a search algorithm and a search space for the corresponding search item, and the search space limits a search range used when corresponding search is performed. The search mode includes any one of a precision mode, a speed mode, an economic mode, and a resource mode.

In some embodiments of this application, a selected combined operator is defined by using the search configuration information and the search mode, so that a model optimization result or process more meets a user requirement.

Optionally, the search configuration information is obtained by the user by performing an input operation or a selection operation on a graphical user interface GUI.

Optionally, before the original model is optimized based on the combined operator, resource consumption for optimizing the original model may be further estimated based on the combined operator, and resource scheduling for performing an operation of optimizing the original model may be further performed based on the resource consumption.

That is, in some embodiments of this application, automatic resource scheduling can be implemented based on a resource consumption status of performing an operation based on the combined operator and a resource use status of the combined operator.

Optionally, when the search configuration information is obtained, an evaluation indicator may be further obtained in this application, where the evaluation indicator indicates a performance objective that needs to be achieved after the original model is optimized.

Correspondingly, when the original model is optimized based on the combined operator, optimization information search may be performed in a comprehensive search space based on the combined operator, and the original model is optimized based on optimization information, to obtain the optimized model, where performance of the optimized model meets the evaluation indicator.

In some embodiments of this application, an optimization model whose performance meets a requirement may be output by setting the evaluation indicator. The evaluation indicator may include any one or more of the following indicators: model accuracy, a model loss, model accuracy, and a model recall rate. Certainly, the evaluation indicator may alternatively be another evaluation indicator, for example, a user-defined indicator. This is not limited in some embodiments of this application.

According to a second aspect, this application further provides another model optimization method. The method includes: providing a configuration interface to a user, where the configuration interface includes a search item list for selection by the user; obtaining an original model and search configuration information, where the search configuration information includes a plurality of search items selected by the user from the search item list, and different search items indicate different search categories for performing optimization information search on the original model; optimizing the original model based on the search configuration information; and providing an optimized model to the user.

In some embodiments of this application, joint search is performed based on the plurality of search items, so that joint optimization of a plurality of dimensions can be performed on the original model, with model performance improved. In addition, the configuration interface may be provided to the user, and the user selects a plurality of search items that need to be searched for, so as to meet a joint search requirement of the user for different search items.

Optionally, the plurality of search items selected by the user from the search item list include at least two of hyperparameter search, network architecture search, data augmentation search, loss function search, optimizer search, and model compression policy search. For meanings indicated by each search item, refer to related descriptions in the first aspect. Details are not described herein.

Optionally, the configuration interface further includes a search item information configuration page and a search mode configuration page, and the search configuration information further includes search item information and a search mode that are configured by the user on the configuration interface.

Optionally, the search mode is used to indicate a principle followed when the original model is optimized, and the search mode includes any one of a precision mode, a speed mode, an economic mode, and a resource mode.

Optionally, when the original model is optimized based on the search configuration information, a plurality of search operators may be first orchestrated based on the search configuration information, to obtain a combined operator. Then, the original model is optimized based on the combined operator.

The combined operator indicates an operator generated after an operation sequence, quantities of operations, and comprehensive search spaces in each operation of the plurality of search operators or those of each search operator are determined. The comprehensive search space is a search space obtained by merging search spaces corresponding to different search items, or may be respective search spaces obtained after search spaces corresponding to different search items affect each other. The original model is optimized based on the combined operator, so that optimization information search can be performed on the original model in the comprehensive search space. This obtains a better solution in the comprehensive space, and improves model performance.

Optionally, an implementation process of the orchestrating a plurality of search operators based on the search configuration information, to obtain a combined operator may be: determining an operation sequence, quantities of operations, or comprehensive search spaces in each operation of the plurality of search operators based on the search configuration information; and generating the combined operator based on the operation sequence, the quantities of operations, or the comprehensive search spaces in each operation of the plurality of search operators.

Optionally, before the original model is optimized based on the combined operator, resource consumption for optimizing the original model may be further estimated based on the combined operator, and resource scheduling for performing an operation of optimizing the original model may be further performed based on the resource consumption.

According to a third aspect, this application further provides a model optimization apparatus. The model optimization apparatus includes: a configuration module, configured to obtain an original model and search configuration information of a user, where the search configuration information includes a plurality of search items, and different search items indicate different search categories for performing optimization information search on the original model; an operator orchestration module, configured to orchestrate a plurality of search operators based on the search configuration information, to obtain a combined operator, where each orchestrated search operator corresponds to one search item, and the search operator indicates an algorithm used to execute the corresponding search item; and a multivariate search module, configured to optimize the original model based on the combined operator, to obtain an optimized model.

Optionally, the plurality of search items include at least two of hyperparameter search, network architecture search, data augmentation search, loss function search, optimizer search, and model compression policy search.

Optionally, the operator orchestration module is specifically configured to: determine an operation sequence, quantities of operations, and comprehensive search spaces in each operation of the plurality of search operators based on the search configuration information; and generate the combined operator based on the operation sequence, the quantities of operations, and the comprehensive search spaces in each operation of the plurality of search operators.

Optionally, the search configuration information further includes search item information and a search mode, each search item corresponds to search item information, and the search mode is used to indicate a principle followed when the original model is optimized.

Optionally, the search mode includes any one of a precision mode, a speed mode, an economic mode, and a resource mode.

Optionally, the search configuration information is obtained by the user by performing an input operation or a selection operation on a graphical user interface GUI.

Optionally, the model optimization apparatus further includes a resource management module, and the resource management module is configured to: estimate, based on the combined operator, resource consumption for optimizing the original model; and perform, based on the resource consumption, resource scheduling for performing an operation of optimizing the original model.

Optionally, the configuration module of the model optimization apparatus is further configured to obtain an evaluation indicator, where the evaluation indicator indicates a performance objective that needs to be achieved after the original model is optimized; and the multivariate search module is further specifically configured to: perform optimization information search in a comprehensive search space based on the combined operator, and optimize the original model based on optimization information, to obtain the optimized model, where performance of the optimized model meets the evaluation indicator.

Optionally, the evaluation indicator includes any one or more of the following indicators: model accuracy, a model loss, model accuracy, and a model recall rate.

According to a fourth aspect, this application further provides another model optimization apparatus. The apparatus includes: a configuration module, configured to: provide a configuration interface to a user, where the configuration interface includes a search item list for selection by the user; and obtain an original model and search configuration information, where the search configuration information includes a plurality of search items selected by the user from the search item list, and different search items indicate different search categories for performing optimization information search on the original model; a optimization module, configured to optimize the original model based on the search configuration information; and a feedback module, configured to provide an optimized model to the user.

Optionally, the plurality of search items selected by the user from the search item list include at least two of hyperparameter search, network architecture search, data augmentation search, loss function search, optimizer search, and model compression policy search.

Optionally, the configuration interface further includes a search item information configuration page and a search mode configuration page, and the search configuration information further includes search item information and a search mode that are configured by the user on the configuration interface.

Optionally, the search mode is used to indicate a principle followed when the original model is optimized, and the search mode includes any one of a precision mode, a speed mode, an economic mode, and a resource mode.

Optionally, the multivariate search module is specifically configured to: orchestrate a plurality of search operators based on the search configuration information, to obtain a combined operator; and optimize the original model based on the combined operator.

Optionally, the multivariate search module is specifically configured to: determine an operation sequence, quantities of operations, or comprehensive search spaces in each operation of the plurality of search operators based on the search configuration information; and generate the combined operator based on the operation sequence, the quantities of operations, or the comprehensive search spaces in each operation of the plurality of search operators.

Optionally, the model optimization apparatus further includes a resource management module, and the resource management module is configured to: estimate, based on the combined operator, resource consumption for optimizing the original model; and perform, based on the resource consumption, resource scheduling for performing an operation of optimizing the original model.

According to a fifth aspect, this application further provides a computing device. A structure of the computing device includes a processor and a memory, and the memory is configured to: store a program that supports the computing device in performing the model optimization method provided in the first aspect or the second aspect; and store data used to implement the model optimization method provided in the first aspect or the second aspect. The processor executes the program stored in the memory, to perform the method provided in the first aspect or the second aspect and the optional implementations of the first aspect or the second aspect. The computing device may further include a communications bus, and the communications bus is configured to establish a connection between the processor and the memory.

According to a sixth aspect, this application further provides a computer-readable storage medium. The computer-readable storage medium stores instructions, and when the instructions are run on a computer, the computer is enabled to perform the model optimization method provided in the first aspect or the second aspect and the optional implementations of the first aspect or the second aspect.

According to a seventh aspect, this application further provides a computer program product including instructions. When the computer program product is run on a computer, the computer is enabled to perform the model optimization method in the first aspect or the second aspect.

Technical effects achieved in the second aspect, the third aspect, the fourth aspect, the fifth aspect, the sixth aspect, and the seventh aspect are similar to technical effects achieved by using corresponding technical means in the first aspect. Details are not described herein again.

Beneficial effects brought by the technical solutions provided in this application include at least the following:

In some embodiments of this application, the search configuration information including the plurality of search items may be obtained, and the search operators corresponding to the plurality of search items are orchestrated based on the search configuration information, to obtain the combined operator. In this way, optimization for the plurality of search items may be performed on the original model based on the combined operator. In other words, in some embodiments of this application, joint optimization of a plurality of dimensions may be performed on the original model, to obtain an optimized model in a comprehensive space, with model performance improved.

BRIEF DESCRIPTION OF DRAWINGS

To describe the technical solutions in the embodiments of this application more clearly, the following briefly describes the accompanying drawings for the embodiments.

FIG. 9 is a schematic diagram of an output interface of an optimized model according to an embodiment of this application;

FIG. 10 is a flowchart of performing automatic resource scheduling based on a combined operator according to an embodiment of this application;

FIG. 11 is a flowchart of another model optimization method according to an embodiment of this application.

DESCRIPTION OF EMBODIMENTS

Figure 1:
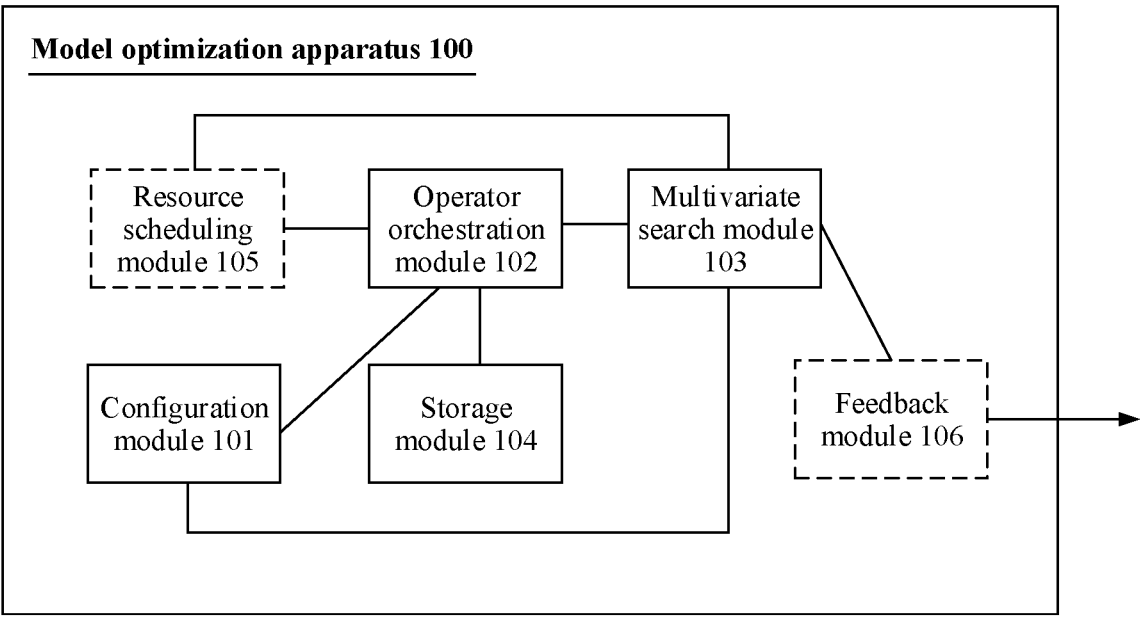
FIG. 1 is a schematic diagram of a structure of a model optimization apparatus according to an embodiment of this application.

To make objectives, technical solutions, and advantages of this application clearer, the following further describes implementations of this application in detail with reference to the accompanying drawings.

Before the embodiments of this application are described in detail, an application scenario of the embodiments of this application is described first.

Currently, AI models are widely used in fields such as image recognition, video analysis, speech recognition, natural language translation, and autonomous driving control. The AI model indicates a mathematical algorithm that can be trained to learn data features and can be used for inference. There are many different types of AI models in the industry. For example, a neural network model is a typical AI model. The neural network model is a mathematical calculation model that imitates a structure and a function of a biological neural network (that is, a central nervous system of an animal). One neural network model may include a plurality of computing layers with different functions, and each layer includes a parameter and a calculation formula. According to different calculation formulas or different functions, different computing layers in the neural network model have different names. For example, a layer used to perform convolution calculation is referred to as a convolutional layer, and the convolutional layer may be used to perform feature extraction on an input image. For brevity, the AI model is referred to as a model for short in some expressions in the embodiments of this application.

As AI models are increasingly widely used, performance requirements for the AI models are increasingly high. For example, performance of the neural network model is closely related to selection of a hyperparameter of the neural network model, network architecture design, and a training sample. How to optimize an original AI model from various aspects to obtain an AI model with higher performance is the focus of the industry.

Based on this, to improve performance of an AI model, after compiling an initial original model, a developer may perform joint search, such as hyperparameter search, network architecture search, and data augmentation search, on the original model by using an optimization method provided in the embodiments of this application, to obtain optimization information of the original model. Then, based on the optimization information, the original model is optimized in terms of a hyperparameter, a network architecture, a training sample, a loss function, an optimizer, and a model compression policy. The original model is an initial AI model on which performance optimization has not been performed, and the original model may be represented in a form of code.

In addition, it should be noted that the hyperparameter search is to search, by using a hyperparameter search algorithm, a specified search space for a hyperparameter that conforms to the original model. It should be understood that the hyperparameter is also referred to as a hyperparameter, and is a parameter in an AI model (for example, a neural network model) that cannot be obtained through model training. For example, the hyperparameter includes parameters such as a learning rate and a quantity of iterations. Hyperparameter settings have great impact on AI model performance. The network architecture search is to search, based on algorithms such as an evolutionary algorithm, a reinforcement learning algorithm, and a differentiable network algorithm, a specified search space for a network architecture that meets a user requirement. The network architecture indicates a basic structure of an AI model. The data augmentation search is to search, based on a specified data set, for a data augmentation policy that meets a user requirement, and then process a sample in the data set according to the data augmentation policy. The data augmentation policy is an algorithm used to preprocess training data, test data, or inference data. Training, testing, or inference is performed on an AI model by using a processed sample in the data set, so that performance of the AI model can be better. The loss function search is to search a specified search space for a loss function that meets a user requirement. The loss function is used to perform model optimization when the original model is trained. The optimizer search is to search a specified search space for an optimizer that meets a requirement, and then perform model parameter learning by using the optimizer, so that performance of an AI model can be better. The model compression policy search is to search a specified search space for a model compression policy, to implement compression and tailoring of an AI model.

The embodiments of this application provide a model optimization method, and the method is performed by a model optimization apparatus. A function of the model optimization apparatus may be implemented by a software system, or may be implemented by a hardware device, or may be implemented by a combination of a software system and a hardware device.

When the model optimization apparatus is a software apparatus, referring to FIG. 1, the model optimization apparatus 100 may be logically divided into a plurality of modules. The modules may have different functions, and the functions of the modules are implemented by a processor in a computing device by reading and executing instructions in a memory. The computing device structure may be a computing device 500 shown in FIG. 5. For example, the model optimization apparatus may include a configuration module 101, an operator orchestration module 102, a multivariate search module 103, and a storage module 104. In a specific implementation, the model optimization apparatus 100 may perform content described in steps 601 to 603 and steps 1001 and 1002, or may perform content described in steps 1101 to 1104 and steps 1001 and 1002. It should be noted that, in the embodiments of this application, division of the structure and the functional modules of the model optimization apparatus 100 is merely an example, and does not constitute a specific limitation.

The configuration module 101 is configured to obtain an original model and search configuration information of a user. The original model of the user may be uploaded by the user, or may be stored in another apparatus or device. The search configuration information may include a plurality of search items configured by the user, and each search item indicates a category of searching for optimization information of the original model. For example, the plurality of search items may indicate hyperparameter search and network architecture search. In this case, the plurality of search items indicate to search for hyperparameter optimization information and network architecture optimization information of the original model. Optionally, the plurality of search items may further include data augmentation search, loss function search, optimizer search, model compression policy search, and the like. This is not limited in the embodiments of this application. In some possible implementations, the search configuration information may further include search item information and a search mode, each piece of search item information corresponds to each search item, and each piece of search item information includes a search space corresponding to a corresponding search item. The search mode may include any one of a precision mode, a speed mode, an economic mode, and a resource mode.

The operator orchestration module 102 is configured to: communicate with the configuration module 101, the storage module 104, and the multivariate search module 103, receive the search configuration information sent by the configuration module 101, and receive a plurality of search operators sent by the storage module 104. The operator orchestration module 102 is configured to orchestrate a plurality of search operators based on the search configuration information, to obtain a combined operator.

It should be noted that the storage module 104 may store the plurality of search operators, for example, a hyperparameter search operator, a network architecture search operator, a data augmentation search operator, a loss function search operator, an optimizer search operator, a model compression policy search operator, and a user-defined search operator. The search operator is an algorithm for implementing corresponding search, or the search operator is a method for searching optimization information corresponding to a corresponding search item. For example, the hyperparameter search operator is a search algorithm for implementing hyperparameter search, that is, a hyperparameter search method. The network architecture search operator is a search algorithm for implementing network architecture search, that is, a network architecture search method.

After receiving the search configuration information sent by the configuration module 101, the operator orchestration module 102 may obtain, from the storage module 104 based on the search items included in the search configuration information, an operator corresponding to each search item. For example, when the plurality of search items included in the search configuration information indicate hyperparameter search and network architecture search, the operator orchestration module 102 may obtain the hyperparameter search operator and the network architecture search operator from the storage module 104 based on the search items. Then, the operator orchestration module 102 may orchestrate the obtained operators, to generate the combined operator. The combined operator indicates an operator generated after an operation sequence, quantities of operations, and comprehensive search spaces in each operation of the plurality of search operators or those of each search operator are determined. After generating the combined operator, the operator orchestration module 102 may send the combined operator to the multivariate search module 103.

Optionally, the storage module 104 may include a plurality of search operators corresponding to each search item, and different search operators indicate different search modes for optimization information corresponding to a same search item. For example, when the search item indicates network architecture search, the storage module 104 may store a network architecture search operator A, a network architecture search operator B, and a network architecture search operator C. When one search item corresponds to a plurality of search operators, one of the search operators may be selected based on the original model, the search item information, and the search mode of the user.

The multivariate search module 103 is configured to communicate with the operator orchestration module 102 and the configuration module 101. The multivariate search module 103 is configured to: receive the combined operator sent by the operator orchestration module 102, and receive the original model of the user that is sent by the configuration module 101. Then, the multivariate search module 103 may optimize the original model of the user based on the combined operator.

Optionally, the model optimization apparatus 100 may further include a resource scheduling module 105. The resource scheduling module 105 is configured to communicate with the operator orchestration module 102 and the multivariate search module 103. The resource scheduling module 105 may receive the combined operator determined by the operator orchestration module 102, estimate, based on the combined operator, resource consumption for optimizing the original model, and perform, based on the resource consumption, resource scheduling for performing an operation of optimizing the original model by the multivariate search module 103.

Optionally, the model optimization apparatus 100 may further include a feedback module 106. The feedback module 106 is configured to communicate with the multivariate search module 103. The feedback module 106 may send a search result of the multivariate search module 103 and an optimized model to the user.

In addition, in some possible cases, some of the plurality of modules included in the model optimization apparatus 100 may be combined into one module. For example, the operator orchestration module 102 and the multivariate search module 103 may be combined into an optimization module, that is, the optimization module integrates functions of the operator orchestration module 102 and the multivariate search module 103.

In the embodiments of this application, the model optimization apparatus 100 described above may be flexibly deployed. For example, the model optimization apparatus 100 may be deployed in a cloud environment. The cloud environment is an entity that provides a cloud service for the user in a cloud computing mode by using a basic resource. The cloud environment includes a cloud data center and a cloud service platform.

Figure 2:
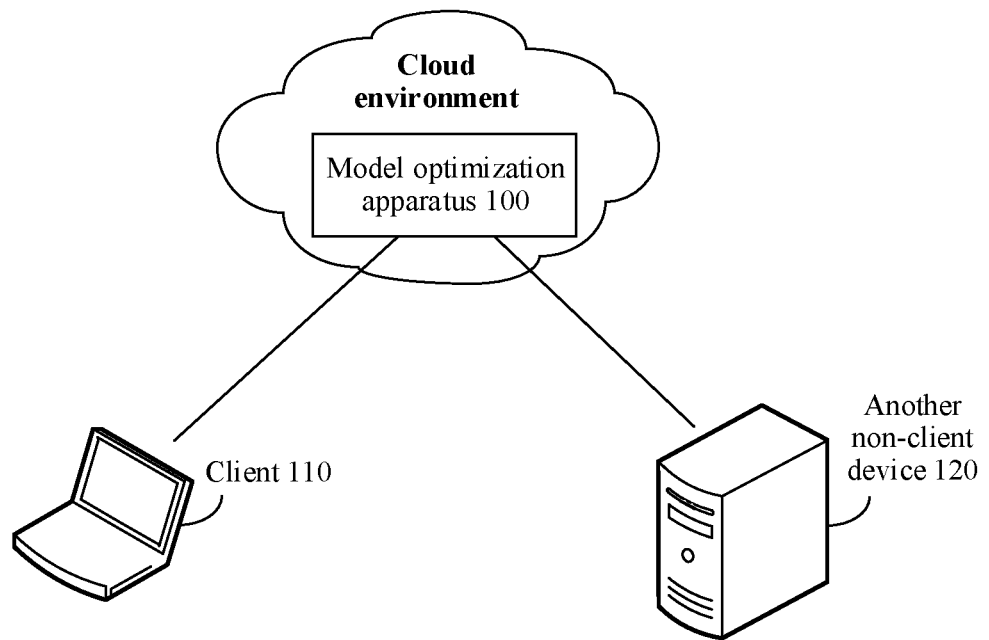
FIG. 2 is a schematic diagram of deployment of a model optimization apparatus according to an embodiment of this application.

The cloud data center includes a large quantity of basic resources (including a computing resource, a storage resource, and a network resource) owned by a cloud service provider. The computing resources included in the cloud data center may be a large quantity of computing devices (for example, servers). The model optimization apparatus 100 may be a software apparatus deployed on a server or a virtual machine in the cloud data center, and the software apparatus may be configured to optimize an AI model. The software apparatus may be deployed on a plurality of servers in a distributed manner, or deployed on a plurality of virtual machines in a distributed manner, or deployed on a virtual machine and a server in a distributed manner. For example, as shown in FIG. 2, the model optimization apparatus 100 is deployed in a cloud environment. A client 110 may send, to the model optimization apparatus 100, an original model uploaded by a user, or another non-client device 120 may send, to the model optimization apparatus 100, an original model generated by or stored in the another non-client device 120. After receiving the original model, the model optimization apparatus 100 may orchestrate a plurality of search operators based on search configuration information, to obtain a combined operator, optimize the original model based on the combined operator, to obtain an optimized model, and send the optimized model to the client 110 or the another non-client device 120.

Figure 3:
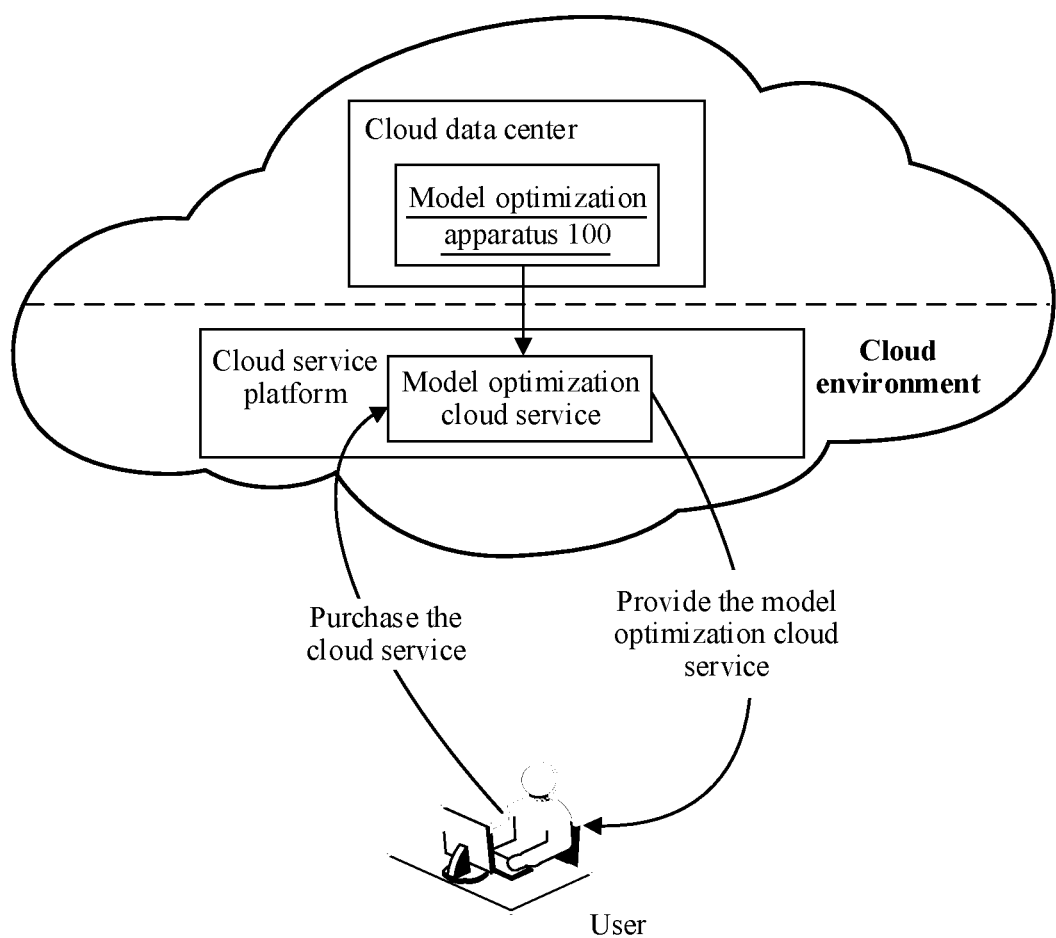
FIG. 3 is a schematic diagram of application of a model optimization apparatus according to an embodiment of this application.

For example, FIG. 3 is a schematic diagram of application of the model optimization apparatus 100 in this application. As shown in FIG. 3, the model optimization apparatus 100 may be deployed by a cloud service provider in a cloud data center. The cloud service provider abstracts a function provided by the model optimization apparatus 100 into a cloud service. A cloud service platform allows a user to consult and purchase the cloud service. After purchasing the cloud service, the user can use a model optimization service provided by the model optimization apparatus 100 in the cloud data center. The model optimization apparatus may alternatively be deployed by a tenant in a computing resource of a cloud data center leased by the tenant. The tenant purchases, by using a cloud service platform, a computing resource cloud service provided by a cloud service provider, and runs the model optimization apparatus 100 in the purchased computing resource, so that the model optimization apparatus 100 optimizes an AI model.

Figure 4:
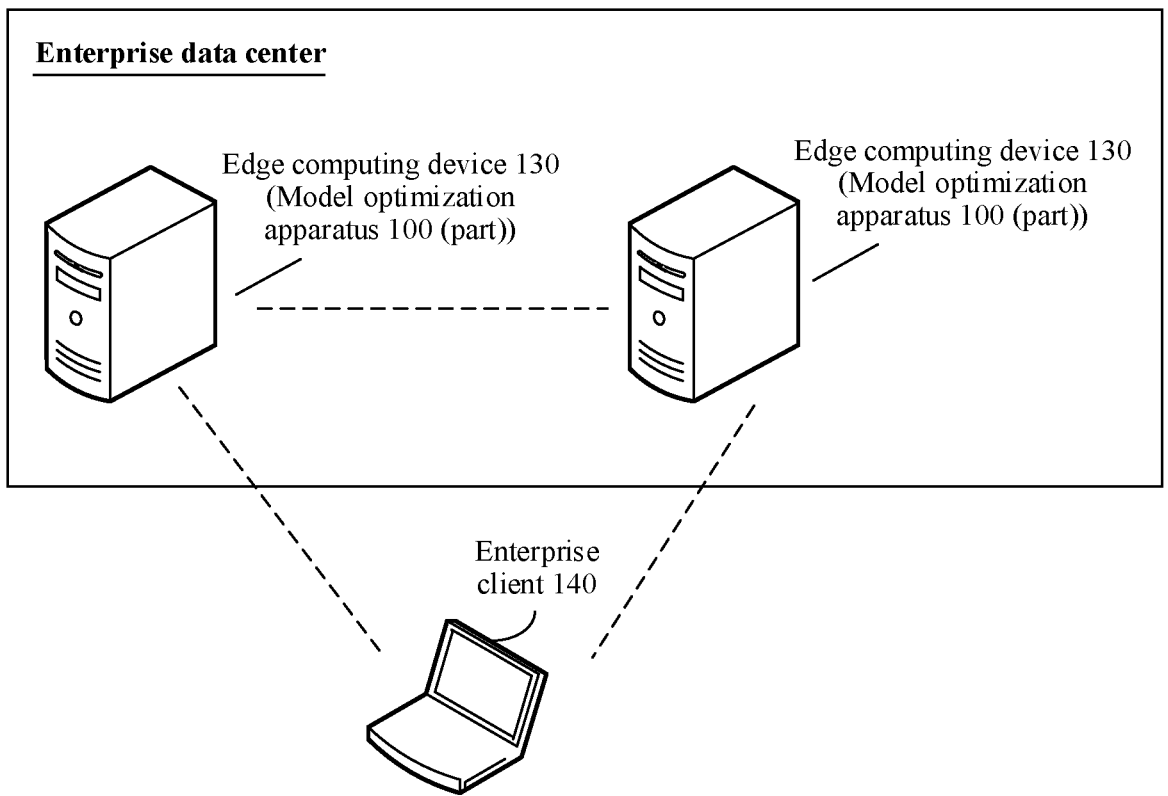
FIG. 4 is a schematic diagram of deployment of another model optimization apparatus according to an embodiment of this application.

Optionally, the model optimization apparatus 100 may alternatively be a software apparatus running on an edge computing device in an edge environment, or one or more edge computing devices in the edge environment. The edge environment is a device set including one or more edge computing devices in an application scenario. The one or more edge computing devices may be computing devices in one data center or computing devices in a plurality of data centers. When the model optimization apparatus 100 is a software apparatus, the model optimization apparatus 100 may be deployed on a plurality of edge computing devices in a distributed manner, or may be deployed on one edge computing device in a centralized manner. For example, as shown in FIG. 4, the model optimization apparatus 100 is deployed in a distributed manner on edge computing devices 130 included in an enterprise data center, and an enterprise client 140 may send an original model to the model optimization apparatus 100. Optionally, the client 140 may further send search configuration information to the model optimization apparatus 100. After receiving the original model, the model optimization apparatus 100 may orchestrate a plurality of search operators based on the search configuration information, to obtain a combined operator, optimize the original model based on the combined operator, to obtain an optimized model, and send the optimized model to the client 140.

Figure 5:
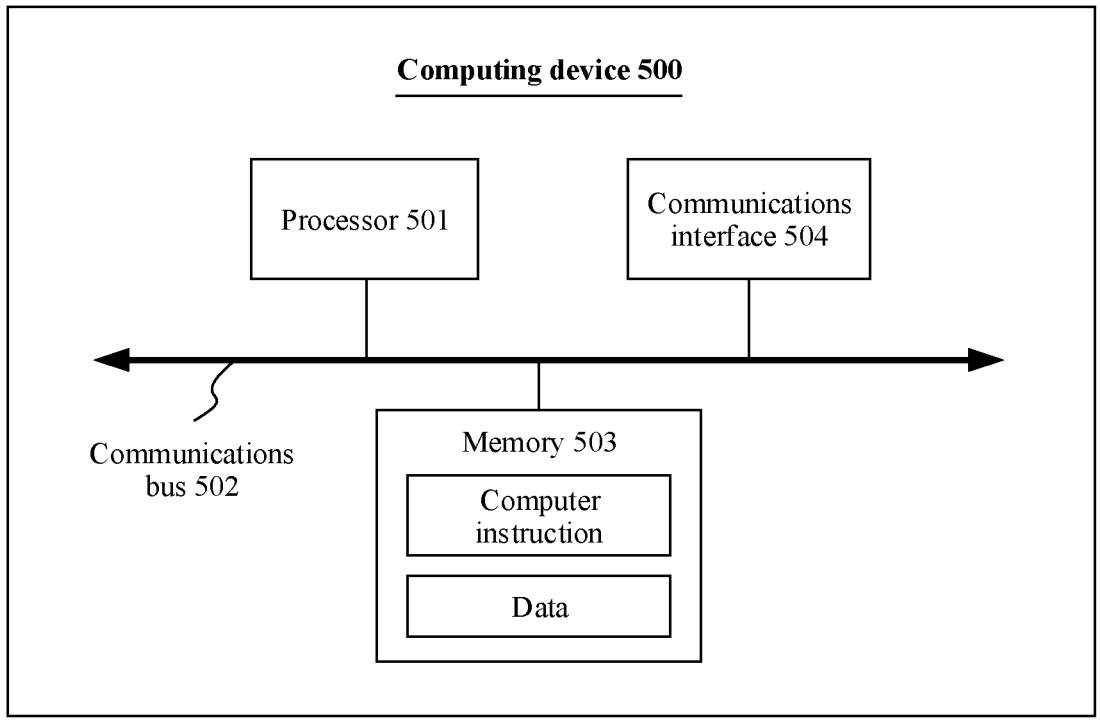
FIG. 5 is a schematic diagram of a structure of a computing device according to an embodiment of this application.

When the model optimization apparatus is a hardware device, the model optimization apparatus may be a computing device in any environment, for example, may be the edge computing device described above, or may be the computing device in the cloud environment described above. FIG. 5 is a schematic diagram of a structure of a computing device 500 according to an embodiment of this application. The computing device 500 includes a processor 501, a communications bus 502, a memory 503, and at least one communications interface 504.

The processor 501 may be a general-purpose central processing unit (CPU), an application-specific integrated circuit (ASIC), a graphics processing unit (GPU), or any combination thereof. The processor 501 may include one or more chips, and the processor 501 may include an AI accelerator, for example, a neural processing unit (NPU).

The communications bus 502 may be included in a channel through which information is transmitted between the components (for example, the processor 501, the memory 503, and the communications interface 504) of the computing device 500.

The memory 503 may be a read-only memory (rROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium capable of carrying or storing expected program code in an instruction form or a data structure form and capable of being accessed by a computer. However, the memory 503 is not limited thereto. The memory 503 may exist independently, and is connected to the processor 501 by using the communications bus 502. Alternatively, the memory 503 may be integrated into the processor 501. The memory 503 may store computer instructions. When the computer instructions stored in the memory 503 are executed by the processor 501, the model optimization method in this application can be implemented. In addition, the memory 503 may further store data required by the processor in a process of performing the foregoing method, and generated intermediate data and/or result data.

The communications interface 504 may be any apparatus like a transceiver, and is configured to communicate with another device or a communications network, for example, the Ethernet, a radio access network (RAN), or a wireless local area network (WLAN).

In specific implementation, in an embodiment, the processor 501 may include one or more CPUs.

In specific implementation, in an embodiment, the computing device may include a plurality of processors. Each of the processors may be a single-core processor (single-CPU) or a multi-core processor (multi-CPU). The processor herein may be one or more devices, circuits, and/or processing cores configured to process data (for example, computer program instructions).

The following describes the model optimization method provided in the embodiments of this application.

Figure 6:
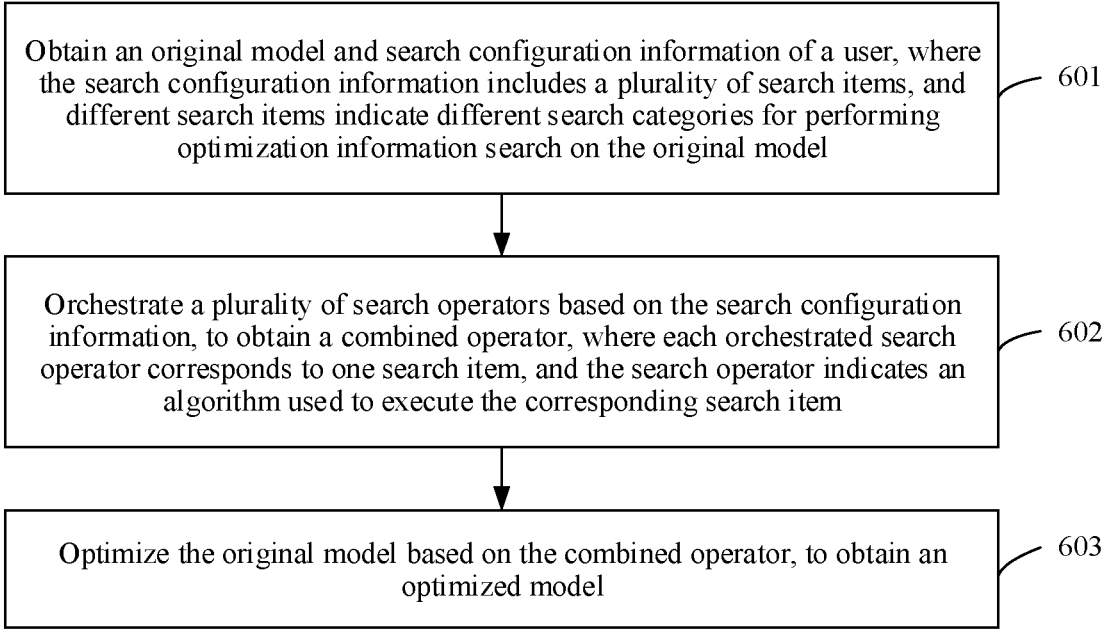
FIG. 6 is a flowchart of a model optimization method according to an embodiment of this application.

FIG. 6 is a flowchart of a model optimization method according to an embodiment of this application. The model optimization method may be performed by the model optimization apparatus 100 described above. As shown in FIG. 6, the method includes the following steps.

Step 601: Obtain an original model and search configuration information of a user, where the search configuration information includes a plurality of search items, and different search items indicate different categories for performing optimization information search on the original model.

In some embodiments of this application, the original model of the user may be uploaded by the user in a form of code. That is, the model optimization apparatus may receive the original model in the form of code that is uploaded by the user. Alternatively, the original model may be obtained by the model optimization apparatus from another apparatus based on a specified storage path, or the original model may be stored in another device and sent by the another device to the model optimization apparatus. In addition, the search configuration information may be obtained by the user by performing an input operation or a selection operation on a GUI.

In a possible implementation, the model optimization apparatus may provide a configuration interface to the user. The configuration interface may include an original model configuration item and a search configuration information item. The user may enter a storage path of the original model into the original model configuration item. The model optimization apparatus may obtain the original model based on the storage path, and configure the search configuration information by using the search configuration information item.

Figure 7:
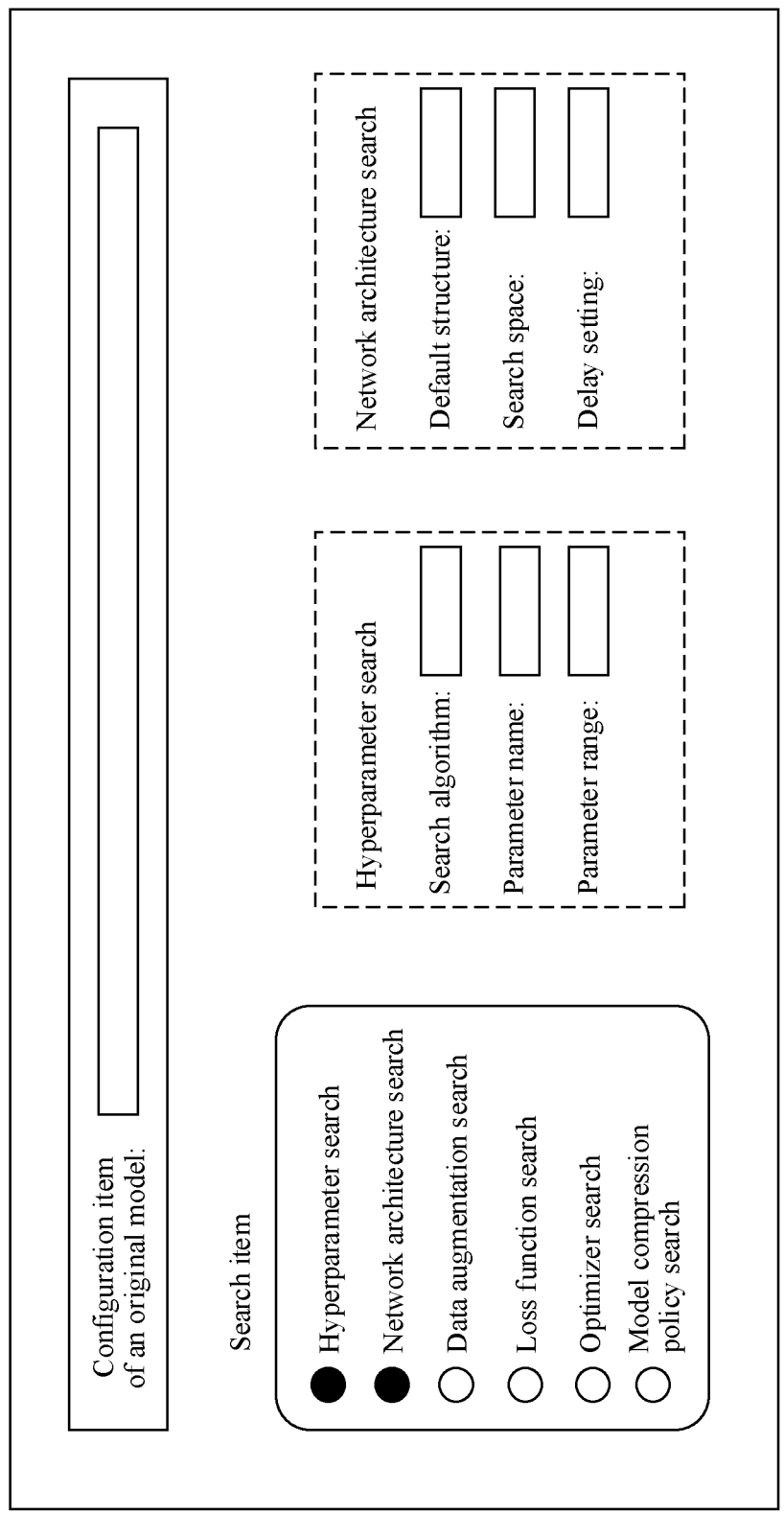
FIG. 7 is a schematic diagram of a configuration interface according to an embodiment of this application.

It should be noted that the search configuration information item may include a search item list. For example, as shown in FIG. 7, the search item list includes a plurality of search items that can be selected, and each search item indicates a category for performing optimization information search on the original model. For example, the search item list may include hyperparameter search, network architecture search, data augmentation search, loss function search, optimizer search, and model compression policy search. The hyperparameter search is to search a specified search space for a hyperparameter that conforms to the original model. The network architecture search is to search a specified search space for a network architecture that meets a user requirement. The data augmentation search is to search a specified data set for a data augmentation policy that meets a user requirement, and then process a sample in the data set according to the data augmentation policy. The data augmentation policy is an algorithm used to preprocess training data, test data, or inference data. Training, testing, or inference is performed on an AI model by using a processed sample in the data set, so that performance of the AI model can be better. The loss function search is to search a specified search space for a loss function that meets a user requirement. The optimizer search is to search a specified search space for an optimizer that meets a requirement, and then perform model parameter learning by using the optimizer, so that performance of an AI model can be better. The model compression policy search is to search a specified search space for a model compression policy, to implement compression and tailoring of a model. Optionally, after the user selects a plurality of search items from the search item list on the GUI interface, the interface further provides a search item information configuration list. In the search item information configuration list, the user may configure one or more pieces of search item information corresponding to a corresponding search item. The search item information includes some information used when a corresponding search item is searched for. For example, the one or more pieces of search item information may include a search algorithm and a search space for the corresponding search item, and the search space limits a search range used when corresponding search is performed. For example, as shown in FIG. 7, after the hyperparameter search and the network architecture search are selected, the interface may display a search item information configuration list corresponding to the hyperparameter search and a search item information configuration list corresponding to the network architecture search. The search item information configuration list corresponding to the hyperparameter search includes a search algorithm configuration item, a parameter name configuration item, and a parameter range configuration item of the hyperparameter search. The parameter range configuration item is equivalent to a search space configuration item corresponding to the hyperparameter search. The search item information configuration list corresponding to the network architecture search includes a default structure configuration item, a search space configuration item, and a delay setting configuration item of the network architecture search. It should be noted that FIG. 7 merely provides examples of several pieces of possible search item information. In some possible implementations, a search item information configuration list corresponding to a selected search item may include less or more search item information.

Figure 8:
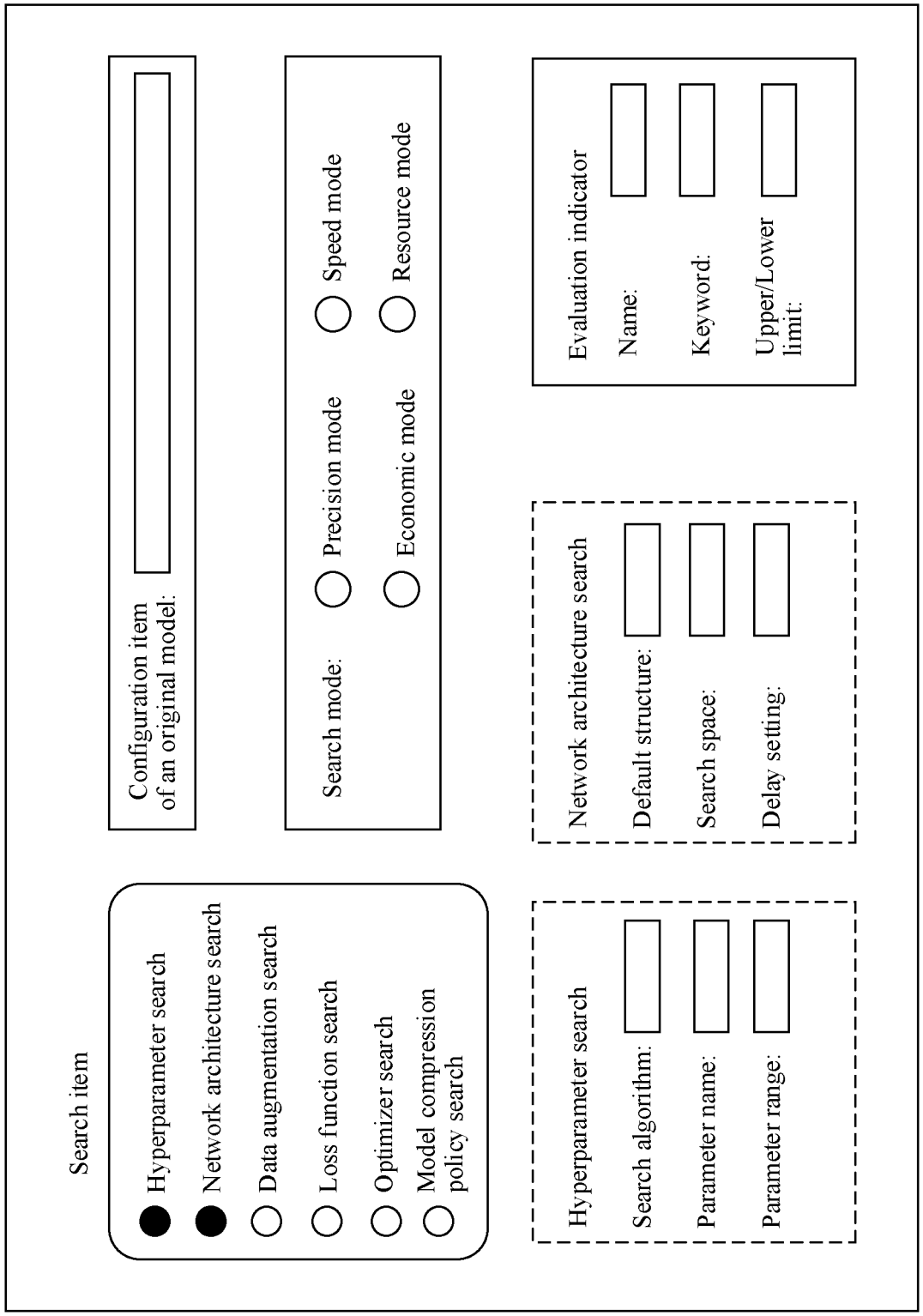
FIG. 8 is a schematic diagram of another configuration interface according to an embodiment of this application.

Optionally, as shown in FIG. 8, the search configuration information item may further include a search mode and an evaluation indicator. The search pattern is used to indicate a principle followed when the original model is optimized. The search mode may include a precision mode, a speed mode, an economic mode, and a resource mode. The precision mode indicates that model optimization is performed with model precision as a target. The speed mode indicates that model optimization is performed with a specific optimization speed as a target. The economic model indicates that model optimization is performed with lowest costs required by the user as a target. The resource mode indicates that model optimization is performed with fewest resources consumed by the model optimization apparatus as a target.

The evaluation indicator is mainly a performance indicator of the optimized model. When an indicator of the optimized original model reaches a specified evaluation indicator, optimization may be stopped. For example, the evaluation indicator may be one or more of indicators such as model accuracy (accuracy), a model loss (loss), model precision (precision), and a recall (recall) rate, or the evaluation indicator may be a user-defined indicator. This is not limited in some embodiments of this application.

The evaluation indicator may usually be used as a condition for stopping model optimization to output an optimized model. For example, when the evaluation indicator is model accuracy, in a process of optimizing the original model, if accuracy of the optimized model reaches the evaluation indicator, optimization may be stopped and the optimized model is output. Alternatively, the evaluation indicator may be affected by the search mode, and the model optimization apparatus may determine, in combination with the search mode and the evaluation indicator, when to stop optimization to output the optimized model. For example, it is assumed that the evaluation indicator set by the user is a lower model precision limit, and the user further selects the precision mode. In this case, in a process of optimizing the original model, after precision of the optimized model reaches the lower model precision limit, because the user further selects the precision mode and the precision mode aims to achieve model precision as high as possible, the model optimization apparatus may further continue to optimize the model, to further improve model precision. However, it is assumed that the user selects the speed mode. In this case, to achieve an optimized speed, after the first optimized model whose precision is greater than the evaluation indicator is obtained, optimization may be stopped and the optimized model is immediately output.

After the user configuration is completed, the model optimization apparatus may obtain the original model uploaded by the user and the configured search configuration information.

It should be noted that only some possible search configuration information items provided in some embodiments of this application are described above. In addition, in the foregoing search configuration information items, some search configuration information is optional for the user, for example, the search mode and the evaluation indicator. In addition, based on an actual requirement, the configuration interface may further include more or fewer search configuration information items. For example, the configuration interface may include no evaluation indicator, but a default evaluation indicator is provided by the model optimization apparatus. For another example, the configuration interface may further include an operator orchestration mode option, and the operator orchestration mode option may indicate a mode of orchestrating a plurality of search operators. This is not limited in some embodiments of this application.

It should be noted that the original model uploaded by the user may be code that is compiled by the user and that is not adaptively modified for the model optimization apparatus. The model optimization apparatus can optimize the original model in subsequent steps after the user performs simple configuration by using the foregoing configuration interface, without modifying code based on a platform requirement. This lowers a use threshold for the user. Optionally, the user may alternatively add declaration information to a code file of the original model. The declaration information may indicate content to be searched for. Optionally, the declaration information may further include other configuration information such as an evaluation indicator.

In another possible implementation, the model optimization apparatus may directly receive the original model in the form of code that is uploaded by the user, and a configuration file. The configuration file may include the search configuration information of the user.

In this implementation, the user may directly write the search configuration information into the configuration file. After receiving the configuration file, the model optimization apparatus may obtain the search configuration information in the configuration file by parsing the configuration file. Content included in the search configuration information is described above. Details are not described herein again. The configuration file may support a plurality of file formats, such as yaml, xml, and txt. This is not limited in some embodiments of this application.

Step 602: Orchestrate a plurality of search operators based on the search configuration information, to obtain a combined operator, where each orchestrated search operator corresponds to one search item, and the search operator indicates an algorithm used to execute the corresponding search item.

In some embodiments of this application, the model optimization apparatus may store search operators corresponding to different search items. The search operator indicates an algorithm for searching for optimization information corresponding to a corresponding search item, for example, a hyperparameter search operator corresponding to hyperparameter search, a network architecture search operator corresponding to network architecture search, or a data augmentation search operator corresponding to data augmentation search.

In a possible implementation, after obtaining the search configuration information, the model optimization apparatus may obtain, based on the plurality of search items included in the search configuration information, the plurality of search operators corresponding to the plurality of search items, and further orchestrate the plurality of search operators. Orchestrating the plurality of search operators is determining a manner in which the plurality of search operators run in combination. For example, the model optimization apparatus may determine, based on the search mode included in the search configuration information and the search item information corresponding to each search item, an operation sequence, quantities of operations, and/or comprehensive search spaces in each operation of the plurality of search operators, and further generate the combined operator.

For example, when the plurality of search items indicate the hyperparameter search and the network architecture search, the model optimization apparatus may obtain the hyperparameter search operator based on the hyperparameter search, and obtain the network architecture search operator based on the network architecture search.

After obtaining the plurality of search operators, the model optimization apparatus may determine, based on the search mode and the search item information that are included in the search configuration information, an operation sequence, quantities of operations, and search spaces in each operation of the plurality of search operators. Search spaces in each operation may be different, and these search spaces include comprehensive search spaces. The comprehensive search space may be a search space obtained by merging search spaces corresponding to different search items, or may be respective search spaces obtained after search spaces corresponding to different search items affect each other.

In an example, assuming that search items selected by the user are the hyperparameter search and the network architecture search, and a search mode selected by the user is the speed mode, a combined operator obtained after the model optimization apparatus orchestrates the hyperparameter search operator and the network architecture search operator may be:

(1) A plurality of possible network structures of the original model are generated by using the network architecture search operator based on the original model in the form of code that is uploaded by the user.

(2) Hyperparameter search is performed on each of the plurality of obtained network structures of the original model in (1) by using the hyperparameter search operator based on a search space and another parameter in search item information that corresponds to the hyperparameter search and that is configured by the user, to obtain a search result. The search result includes a found candidate hyperparameter corresponding to each network structure.

(3) The search result obtained in (2) is evaluated by using the network architecture search operator, to select a target structure with a best effect.

(4) Hyperparameter search is performed again on the target structure in the comprehensive search space by using the hyperparameter search operator, to obtain a target hyperparameter that corresponds to the target structure and whose evaluation indicator conforms to a reference evaluation indicator. The comprehensive search space is a search space obtained after a search space corresponding to the network architecture search and a search space corresponding to the hyperparameter search are combined. Alternatively, the comprehensive search space is a search space obtained after a search space included in the search item information corresponding to the hyperparameter search is adjusted based on a network architecture search result and a hyperparameter search result. The reference evaluation indicator may be an evaluation indicator configured by the user. Certainly, when the user does not configure an evaluation indicator, the evaluation indicator may be a default evaluation indicator.

In another example, assuming that search items selected by the user are the hyperparameter search, the network architecture search, and the data augmentation search, and a search mode selected by the user is the precision mode, a combined operator obtained after the model optimization apparatus orchestrates the hyperparameter search operator, the network architecture search operator, and the data augmentation search operator may be:

(1) A search space corresponding to the data augmentation search is searched for a data augmentation policy by using the data augmentation search operator based on a specified data set, and data augmentation processing is performed on a training sample in the specified data set by using the found data augmentation policy.

(2) An outer layer invokes the hyperparameter search operator, and the inner layer invokes the network architecture search operator, to search a specified comprehensive search space through a double-layer loop to obtain a plurality of groups of search results, where each group of search results includes a network architecture and a corresponding hyperparameter. It should be noted that, in a search process, the specified comprehensive search space is obtained by combining the search space corresponding to the hyperparameter search and the search space corresponding to the network architecture search, and the specified comprehensive search space changes continuously with a result of an each-layer loop. In addition, in the search process, the model may be trained and tested by using the data set on which augmentation processing is performed in (1), to obtain an evaluation indicator corresponding to each group of search results.

(3) Results whose evaluation indicators rank top N are selected from the plurality of groups of search results obtained in (2) for outputting.

It can be learned that, in some embodiments of this application, when searching for the plurality of search items, the model optimization apparatus may implement joint optimization of a plurality of dimensions by orchestrating the search operators. In addition, in the search process, the search spaces of the plurality of search items affect each other or are combined. In this way, the optimized model obtained based on the combined operator obtained through orchestration is an optimized model in a joint search space including a plurality of search dimensions, with performance of the optimized model improved.

It should be noted that several possible implementations of the combined operator provided in some embodiments of this application are described above, to describe a process of orchestrating the plurality of search operators corresponding to the search items to obtain the combined operator. A search operator orchestration manner varies with a search item. This is not limited in some embodiments of this application.

In the foregoing implementation, the model optimization apparatus may orchestrate the plurality of search operators in real time based on the search configuration information, to obtain the combined operator. Optionally, in some other possible implementations, the model optimization apparatus may orchestrate search operators corresponding to different search items in advance, to obtain different combined operators, and test features of the different combined operators that exist during model optimization. For example, model optimization performed by using one combined operator is more accurate, and optimization performed by using another combined operator is faster. The model optimization apparatus may correspondingly store a combined search item, a corresponding combined operator, and a feature of the combined operator. For example, a combined search item including a hyperparameter search item and a network architecture search item corresponds to a combined operator 1, and a feature corresponding to the combined operator 1 is high precision. In addition, the combined search item may further correspond to a combined operator 2, and a feature corresponding to the combined operator 2 is a high speed. In this case, when obtaining the search configuration information, the model optimization apparatus may first determine a matched combined search item from the foregoing correspondence based on the plurality of search items included in the search configuration information, determine, based on the search mode included in the search configuration information, a combined operator whose feature matches the search mode from the combined operators corresponding to the combined search item, and after the matched combined operator is found, configure a search space in each operation of the combined operator based on the search item information in the search configuration information.

Step 603: Optimize the original model based on the combined operator, to obtain an optimized model.

After obtaining the combined operator, the model optimization apparatus may optimize the original model by using the combined operator.

For example, the model optimization apparatus may perform optimization information search in the comprehensive search space based on the combined operator, and optimize the original model based on found optimization information, to obtain the optimized model. Performance of the optimized model meets an evaluation indicator set by the user or a default evaluation indicator.

The model optimization apparatus may sequentially execute operators in an execution sequence of the operators in the combined operator, to perform search in the comprehensive search space, and obtain the optimization information of the original model corresponding to the plurality of search items. For example, when the search items indicate the hyperparameter search and the network architecture search, the optimization information includes hyperparameter optimization information and network architecture optimization information for the original model. The optimization information may be information that can directly replace corresponding content in the original model, for example, may be a hyperparameter that directly replaces a hyperparameter of the original model. Alternatively, the optimization information may be difference information used to change corresponding content in the original model, for example, may be difference data of a hyperparameter. In this way, the difference data may be added to the hyperparameter of the original model, to optimize the hyperparameter of the original model.

After obtaining the optimization information, the model optimization apparatus may optimize the original model based on the optimization information, to obtain the optimized model. Then, the model optimization apparatus may output the optimized model. Optionally, the model optimization apparatus may output optimization information corresponding to each search item and a performance indicator corresponding to the optimized model, for example, accuracy and an inference delay. The model optimization apparatus may output the foregoing content in a form of a GUI or in a form of an interface file.

For example, as shown in FIG. 9, when search items selected by the user are the hyperparameter search and the network architecture search, after the optimized model is obtained, a storage path of the optimized model, optimization information corresponding to the hyperparameter search (that is, a found hyperparameter), optimization information corresponding to the network architecture search (that is, a found network architecture), and accuracy and an inference delay of the optimized model may be displayed on the GUI.

In some possible implementations, in a search process, the model optimization apparatus may obtain a plurality of optimized models that meet a set evaluation indicator. In this case, the model optimization apparatus may rank the plurality of optimized models in descending order of performance indicators, and then output optimized models whose performance indicators rank top N. Similarly, when the optimized models are output, optimization information and a performance indicator of each search item corresponding to each optimized model may be further output.

In some embodiments of this application, the search configuration information including the plurality of search items may be obtained, and the search operators corresponding to the plurality of search items are orchestrated based on the search configuration information, to obtain the combined operator. In this way, optimization for the plurality of search items may be performed on the original model in the comprehensive search space based on the combined operator. In other words, in some embodiments of this application, joint optimization of a plurality of dimensions may be performed on the original model, to obtain an optimized model in a comprehensive space, with model performance improved.

An implementation process of optimizing a model is described in the foregoing embodiments. Optionally, in some embodiments of this application, before optimizing the model, the model optimization apparatus may further implement automatic computing resource scheduling based on the combined operator.

For example, FIG. 10 is a flowchart of performing automatic resource scheduling based on a combined operator. The process includes the following steps.

Step 1001: Estimate, based on a combined operator, resource consumption for optimizing an original model.

The model optimization apparatus may estimate, based on an operation resource required by an operation of each operator in the combined operator, parameters such as all resources that need to be consumed when the combined operator is run, a computing resource peak, a fluctuation status, and a computing resource peak duration. The parameter may reflect resource consumption in a process of optimizing the original model.

Optionally, in some embodiments of this application, in addition to the resource consumption in the process of optimizing the original model, the model optimization apparatus may further obtain resource consumption for another optimization task parallel to the optimization of the original model.

Step 1002: Perform, based on the resource consumption, resource scheduling for performing an operation of optimizing the original model.

After estimating the resource consumption for optimizing the original model, the model optimization apparatus may obtain a current computing resource use parameter, for example, determine a currently used computing resource, a remaining computing resource, and a resource that may be released in a process of optimizing the original model. Then, the model optimization apparatus may allocate, based on the resource consumption for optimizing the original model and the current computing resource use parameter, a corresponding computing resource to an operation of each operator in the combined operator in the process of optimizing the original model.

It should be noted that, in some embodiments of this application, a resource management model used to perform resource allocation may be deployed on the model optimization apparatus. The resource management model may be obtained by using a deep learning algorithm and by learning a running parameter and resource running feedback data that are used in each optimization. In addition, the running parameter and the resource running feedback data that are used in each optimization may be shared by model optimization apparatuses in different networks. After obtaining the resource consumption for optimizing the original model and the current computing resource use parameter, the model optimization apparatus may use the two parameters as inputs of the resource management model, to obtain resource allocation data by using the resource management model, and further allocate a corresponding computing resource based on the resource allocation data for optimization of the original model.

Optionally, when the model optimization apparatus further obtains resource consumption for another optimization task parallel to the optimization of the original model, the model optimization apparatus may further optimize the computing resource based on the resource consumption for optimizing the original model and the resource consumption for the another parallel optimization task.

The model optimization apparatus may alternatively optimize the computing resource by adjusting steps of concurrent tasks based on the resource consumption for optimizing the original model and the resource consumption for the another parallel optimization task.

For example, the second combined operator shown in step 602 is used as an example. It is assumed that parallel optimization is performed on two different original models by using the combined operator. In the combined operator, resource consumption in step 1 and that in step 3 are relatively large, and resource consumption in another step is relatively small. When optimization tasks of two models are concurrently executed, time stagger is performed through resource consumption calculation in a search step, a step with large resource consumption is used together with a step with small resource consumption, and the steps are adjusted. For example, step 1 and step 2 in one of the tasks may be exchanged.

Alternatively, the model optimization apparatus may optimize the computing resource by adjusting resource consumption for a step of a single task based on the resource consumption for optimizing the original model and the resource consumption for the another parallel optimization task.

For example, when there are a relatively small quantity of computing resources or a plurality of requests are simultaneously sent to the model optimization apparatus, resource consumption for a single task is reduced on the premise that a user requirement is met, for example, an amount of concurrent training performed during network architecture search or hyperparameter search of the single task is reduced, that is, resource configuration of a sub-task in a single search step is dynamically adjusted.

It can be learned that, in some embodiments of this application, the model optimization apparatus may implement automatic resource scheduling based on a resource consumption status of performing an operation based on the combined operator and a resource use status of the model optimization apparatus. In addition, the model optimization apparatus implements, based on resource consumption statuses of a plurality of concurrent optimization tasks, resource optimization by adjusting steps of concurrent tasks or by adjusting resource consumption in a single task.

The foregoing embodiment mainly describes an implementation process in which the model optimization apparatus 100 optimizes the original model. The following describes an implementation process of the model optimization method from a perspective of interaction between a user and the model optimization apparatus 100. For example, as shown in FIG. 11, the method includes the following steps.

Step 1101: Provide a configuration interface to a user, where the configuration interface includes a search item list for selection by the user.

In some embodiments of this application, the model optimization apparatus may send related information of the configuration interface to a client corresponding to the user, and the client displays the configuration interface, to provide the configuration interface to the user to configure the related information.

For an implementation of the configuration interface, refer to the configuration interface described in the embodiment shown in FIG. 6. Details are not described herein again.

Step 1102: Obtain an original model and search configuration information, where the search configuration information includes a plurality of search items selected by the user from the search item list, and different search items indicate different search categories for performing optimization information search on the original model.

In some embodiments of this application, the model optimization apparatus may obtain configuration information, such as a search item, configured by the user in the configuration interface. In addition, for information that is not configured by the user in the configuration interface, such as an evaluation indicator, the model optimization apparatus may obtain preset default configuration.

In addition, for an implementation process of obtaining an original model, the model optimization apparatus may obtain an original model based on a storage path configured by the user in the configuration interface, or may receive an original model directly uploaded by the user by using a client, or may obtain an original model from another device. For a specific obtaining manner, refer to the method for obtaining the original model in the embodiment shown in FIG. 6. In addition, for a representation manner of the original model, refer to descriptions in the embodiment shown in FIG. 6. Details are not described herein again.

Step 1103: Optimize the original model based on the search configuration information.

After obtaining the search configuration information, the model optimization apparatus may orchestrate a plurality of search operators based on the search configuration information, to obtain a combined operator, and optimize the original model based on the combined operator, to obtain an optimized model.

For an implementation process of orchestrating a plurality of search operators based on the search configuration information, to obtain a combined operator, and optimizing the original model based on the combined operator, refer to related descriptions of steps 602 and 603 in the embodiment shown in FIG. 6. Details are not described herein again.

Step 1104: Provide the optimized model to the user.

After obtaining the optimized model, the model optimization apparatus may send the optimized model to the client. Optionally, the model optimization apparatus may send, to the client, optimization information corresponding to each search item and a performance indicator corresponding to the optimized model, for example, accuracy and an inference delay. The model optimization apparatus may output the foregoing content to the client in a form of a GUI or in a form of an interface file, for example, as shown in FIG. 9.

In some possible implementations, in a search process, the model optimization apparatus may obtain a plurality of optimized models that meet a set evaluation indicator. In this case, the model optimization apparatus may rank the plurality of optimized models in descending order of performance indicators, and then send optimized models whose performance indicators rank top N to the client. Similarly, when the optimized models are fed back, optimization information and a performance indicator of each search item corresponding to each optimized model may be further fed back.

In some embodiments of this application, the model optimization apparatus obtains the original model and the search configuration information, and performs joint search for optimization information on the original model based on the plurality of search items included in the search configuration information, so that joint optimization of a plurality of dimensions can be performed on the original model, with model performance improved. The model optimization apparatus may provide the configuration interface to the user, and the user configures search information such as a search item and a search mode in the configuration interface based on a requirement of the user, so as to meet different optimization requirements of the user. This is flexible and easy to operate, and relieves use load of the user.

It should be noted that, in some embodiments of this application, before optimizing the original model, the model optimization apparatus may also implement automatic resource scheduling and optimization by using the resource scheduling method in the embodiment shown in FIG. 10. Details are not described herein again.

An embodiment of this application further provides the model optimization apparatus 100 shown in FIG. 1. Modules and functions included in the model optimization apparatus 100 are described above. Details are not described herein again.

In some embodiments, the configuration module 101 in the model optimization apparatus 100 is configured to perform step 601 in the foregoing embodiment. The operator orchestration module 102 is configured to perform step 602 in the foregoing embodiment. The multivariate search module 103 is configured to perform step 603 in the foregoing embodiment.

Optionally, the model optimization apparatus 100 may further include a resource scheduling module 105. The resource scheduling module 105 may be configured to perform step 1001 and step 1002 in the foregoing embodiment.

In some other embodiments, the configuration module 101 in the model optimization apparatus 100 is configured to perform step 1101 and step 1102 in the foregoing embodiment. The operator orchestration module 102 and the multivariate search module 103 may be combined into one optimization module, and the optimization module may be configured to perform step 1103 in the foregoing embodiment. The feedback module 106 is configured to perform step 1104 in the foregoing embodiment.

An embodiment of this application further provides the computing device 500 shown in FIG. 5. The processor 501 in the computing device 500 reads a group of computer instructions stored in the memory 503, to perform the foregoing model optimization method.

Figure 12:
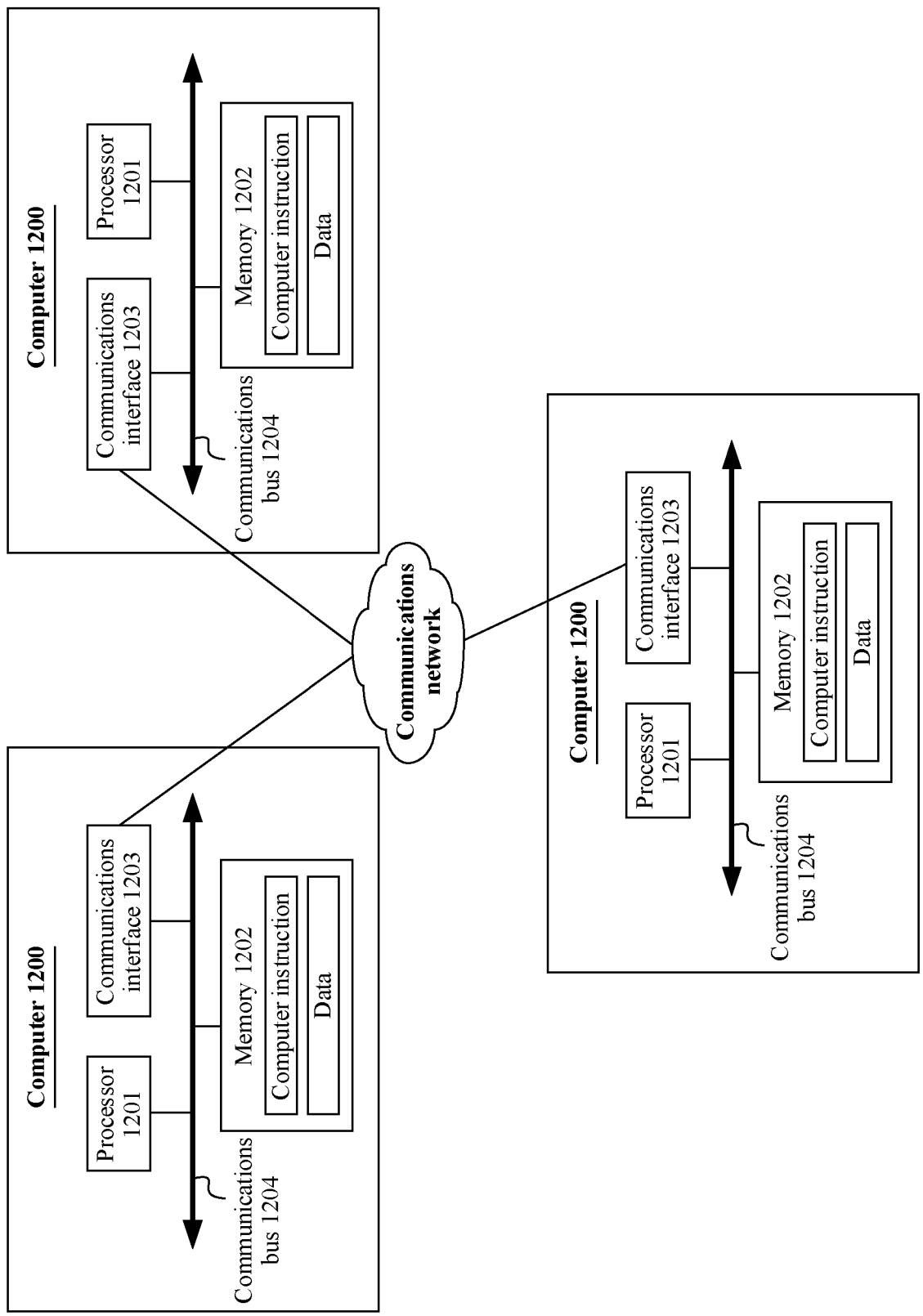
FIG. 12 is a schematic diagram of a structure of a computer system according to an embodiment of this application.

The modules in the model optimization apparatus 100 provided in some embodiments of this application may be deployed on a plurality of computers in the same environment or different environments in a distributed manner. Therefore, this application further provides a computing device (which may also be referred to as a computer system) shown in FIG. 12. The computer system includes a plurality of computers 1200. A structure of each computer 1200 is the same as or similar to the structure of the computing device 500 in FIG. 5. Details are not described herein again.

A communications channel is established between the computers 1200 through a communications network. Each computer 1200 runs any one or more of the configuration module 101, the operator orchestration module 102, the multivariate search module 103, the resource scheduling module 105, and the feedback module 106. Any computer 1200 may be a computer (such as a server) in a cloud data center, an edge computer, or a terminal computing device.

Descriptions of procedures corresponding to the foregoing figures have different focuses. For a part in a procedure not described in detail, refer to related descriptions of other procedures.

All or some of the foregoing embodiments may be implemented by using software, hardware, firmware, or any combination thereof. When software is used to implement the embodiments, all or some of the embodiments may be implemented in a form of a computer program product. The computer program product for implementing model optimization includes one or more computer instructions for performing model optimization. When the computer program instructions are loaded and executed on a computer, all or some of the procedures or functions described in FIG. 6 and FIG. 10 in the embodiments of this application are generated, or all or some of the procedures or functions described in FIG. 11 and FIG. 10 in the embodiments of this application are generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A computing device comprising:
   a memory storing executable instructions;
   a processor configured to execute the executable instructions to perform operations of:
   receiving an AI model and search configuration information, wherein the search configuration information comprises a plurality of search items and search item information, the search item information includes a search space for each search item and a search algorithm, and the search space limits a search range used when corresponding search is performed, and different search items indicate different search categories for performing optimization information search on the AI model, wherein the received plurality of search items comprise at least two categories of hyperparameter search, network architecture search, data augmentation search, loss function search, optimizer search, and model compression policy search;
   executing, optimization on the AI model according to search configuration information, to obtain an optimized model.

2. The computing device according to claim 1, wherein the processor is configured to arrange the operation sequence by performing:
 determining a comprehensive search spaces based on the search configuration information, wherein the comprehensive search space is a search space obtained by merging search spaces corresponding to different search items, or is respective search spaces obtained after search spaces corresponding to different search items affect each other; and
 wherein the operation of executing optimization on the AI model comprises: executing, optimization on the AI model according to the comprehensive search spaces, to obtain the optimized model.

3. The computing device according to claim 2, wherein the operation of executing optimization on the AI model comprises: performing model optimization with lowest costs required by the user as a target or performing model optimization with fewest resources consumed by the model optimization apparatus as a target.

4. The computing device according to claim 3, wherein the processor is configured to further execute the executable instructions to perform operations of:
 estimating, resource consumption for optimizing the AI model; and
 performing, based on the resource consumption, resource scheduling for performing the operation sequence for optimizing the AI model.

5. The computing device according to claim 4, wherein the processor is configured to further execute the executable instructions to perform an operation of:
 obtaining an evaluation indicator, wherein the evaluation indicator indicates a performance objective that needs to be achieved after the AI model is optimized; and
 wherein the operation of executing the operation sequence comprises:
 performing optimization information search in a comprehensive search space and optimizing the AI model based on optimization information, to obtain the AI model that meets the evaluation indicator.

6. The computing device according to claim 5, wherein the evaluation indicator indicates model accuracy, a model loss, or a model recall rate.

* * * * *